(12) United States Patent
Rupp

(10) Patent No.: US 11,288,164 B2
(45) Date of Patent: Mar. 29, 2022

(54) DYNAMIC DISTRIBUTED TRACING INSTRUMENTATION IN A MICROSERVICE ARCHITECTURE

(71) Applicant: RED HAT, INC., Raleigh, NC (US)

(72) Inventor: Heiko Rupp, Stuttgart, DE (US)

(73) Assignee: Red Hat, Inc., Raleigh, NC (US)

( * ) Notice: Subject to any disclaimer, the term of this patent is extended or adjusted under 35 U.S.C. 154(b) by 78 days.

(21) Appl. No.: 16/705,911

(22) Filed: Dec. 6, 2019

(65) Prior Publication Data

US 2021/0173759 A1 Jun. 10, 2021

(51) Int. Cl.
G06F 9/44 (2018.01)
G06F 11/34 (2006.01)
G06F 11/36 (2006.01)
G06F 8/74 (2018.01)
G06F 9/54 (2006.01)
G06F 9/48 (2006.01)

(52) U.S. Cl.
CPC ............ *G06F 11/3466* (2013.01); *G06F 8/74* (2013.01); *G06F 9/4843* (2013.01); *G06F 9/547* (2013.01); *G06F 11/3636* (2013.01)

(58) Field of Classification Search
None
See application file for complete search history.

(56) References Cited

U.S. PATENT DOCUMENTS

| | | | |
|---|---|---|---|
| 2005/0223368 A1* | 10/2005 | Smith ................ | G06F 11/3636 717/128 |
| 2018/0203794 A1* | 7/2018 | Voccio ..................... | G06F 8/70 |
| 2018/0205627 A1* | 7/2018 | Sripatanaskul ......... | H04L 67/16 |
| 2019/0361766 A1* | 11/2019 | Cardoso .............. | G06F 11/0778 |
| 2020/0257680 A1* | 8/2020 | Danyi ................ | G06F 11/3409 |
| 2020/0328952 A1* | 10/2020 | Makwarth .............. | H04L 41/22 |
| 2020/0372007 A1* | 11/2020 | Ross .................. | G06F 16/2365 |
| 2021/0119892 A1* | 4/2021 | Kant .................. | G06F 11/3447 |
| 2021/0133014 A1* | 5/2021 | Agarwal .............. | G06F 11/079 |
| 2021/0149787 A1* | 5/2021 | Nguyen ............. | G06F 11/3006 |

OTHER PUBLICATIONS

BMJ Labs. BMJ Publishing Group Ltd. (Sep. 3, 2019). An experimental publishing technology news aggregator. Retrieved from https://digital.bmj.com/time-to-say-goodbye-to-pubtechgator/.

(Continued)

*Primary Examiner* — Insun Kang
(74) *Attorney, Agent, or Firm* — Womble Bond Dickinson (US) LLP

(57) ABSTRACT

A tracing operation is initiated on a service, wherein the service comprises a plurality of method calls. A span is generated comprising timing information associated with the service, wherein the span comprises a plurality of nested spans associated with the plurality of method calls. A determination is made as to whether one or more method calls of the plurality of method calls are causing the service to underperform in view of the plurality of nested spans. In response to determining that the one or more method calls of the plurality of method calls are causing the service to underperform, a remedial action associated with the one or more method calls is performed.

17 Claims, 12 Drawing Sheets

(56) References Cited

OTHER PUBLICATIONS

McAnlis, C. (Oct. 17, 2018). Reduce latency with stackdriver trace. Retrieved from https://medium.com/@duhroach/reduce-latency-with-stackdriver-trace-bb3ddde85e06.
Diane Mueller-Klingspor, Using OpenTracing with Jaeger to collect Application Metrics in Kubernetes, Develop using Red Hat's most valuable products, Jul. 10, 2017, pp. 1-17, Red Hat Inc.

* cited by examiner

DYNAMIC DISTRIBUTED TRACING INSTRUMENTATION IN A MICROSERVICE ARCHITECTURE

TECHNICAL FIELD

Aspects of the present disclosure relate to a microservice architecture, and more particularly, to implementing dynamic distributed tracing instrumentation in a microservice architecture.

BACKGROUND

Microservice architecture is an architectural style of a computing system that structures an application as a collection of services. The services can be independently developed, tested and deployed by different teams. Microservice architectures enable the deployment of large, complex applications at a rapid pace.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
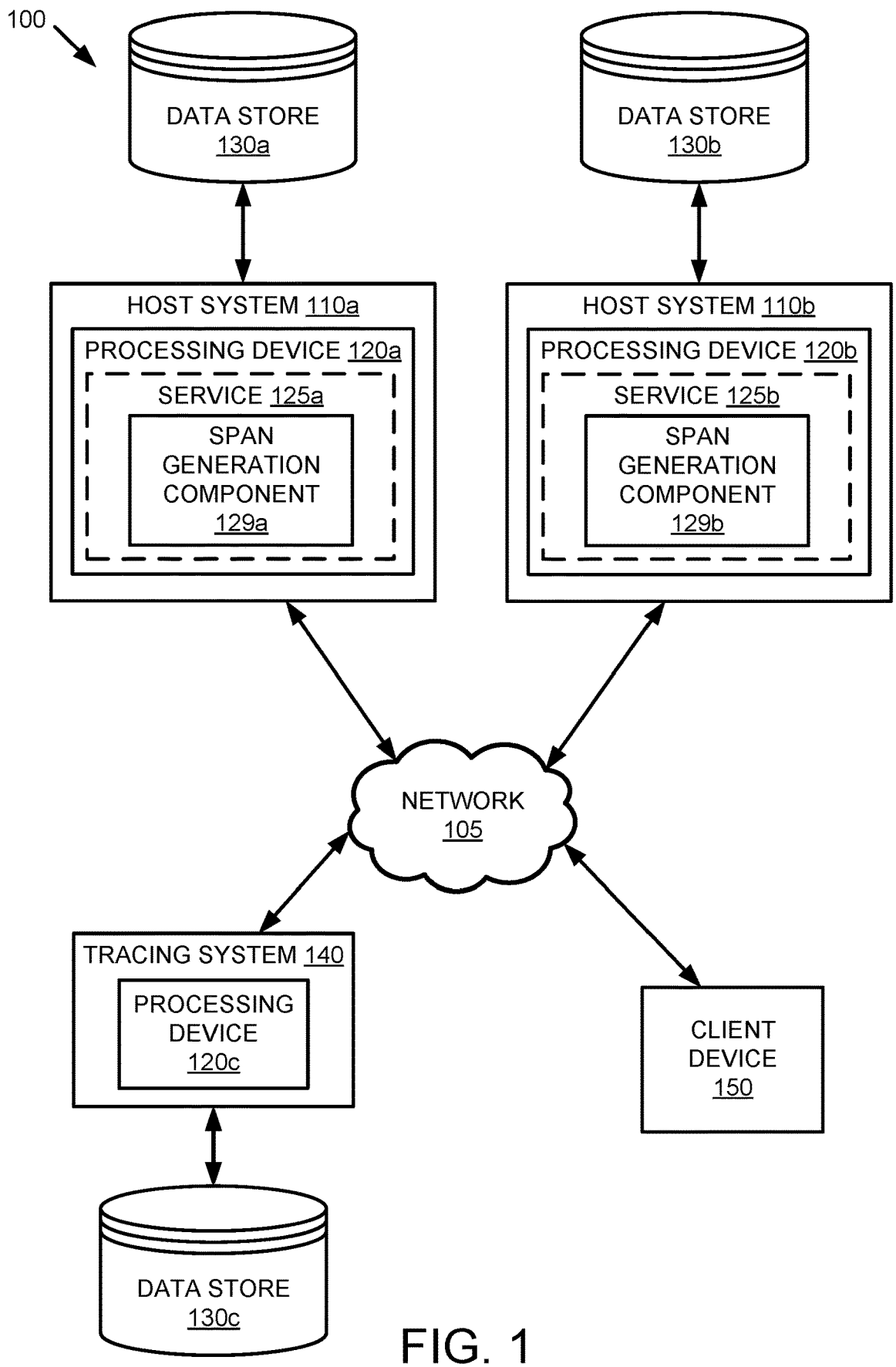
FIG. 1 is a block diagram that illustrates an example data center, in accordance with some embodiments.

On a microservice architecture, an application being developed may be made up of multiple services. Each of the services may include one or more method calls and/or one or more internal processes. The method call may correspond to a service invoking a method and control of the service being transferred to the method. The method may then subsequently return control to the service once the method has executed. In some embodiments, a service may include one or more calls to other services of the microservice architecture.

Distributed tracing is a method of monitoring the performance of an application, particularly applications developed in a microservice architecture. When using distributed tracing, a span is generated for an application. The span may correspond to a total amount of time taken to run an application or service. When an application is executed, calls are made to the service(s) used by the application. The service(s) may include hooks and a trace identification that is used to generate nested spans that correspond to the amount of time to run the individual method calls of the service(s). Timing information acquired from the span that includes the nested spans may then be provided to a tracing system.

However, using distributed tracing on a large number of applications/services generates large amounts of tracing data that is transmitted to the tracing system, consuming system bandwidth. Furthermore, constantly using distributed tracing on an application increases the latency of the application, decreasing performance. Accordingly, many developers do not instrument the code for distributed tracing in their services. Once an issue does arise (e.g., a particular service is causing the application to underperform), the developer may manually instrument the distributed tracing code. However, manually instrumenting the code is a labor intensive process and the code may not be instrumented in time to debug the issue.

Aspects of the disclosure address the above-noted and other deficiencies by dynamically instrumenting distributed tracing in a microservice architecture. Each of the services of an application may include processing logic executing a span generation component that monitors the duration of spans/nested spans of method calls of the services. The processing logic may determine if one or more of the method calls and/or internal processes is causing underperformance of a service and/or application. The method calls and/or internal processes may cause underperformance if the duration of a nested span for a method call deviates from an anticipated time of the method call by a threshold value. For example, if a duration of a nested span for a method call is one standard deviation greater than an anticipated time for the method call, then the method call is causing underperformance.

Upon determining that a method call is causing underperformance, the processing logic may perform a remedial action associated with the method call. In an embodiment, the processing logic may transmit an indication to a tracing system that the method call is causing underperformance.

The tracing system may then notify a developer that there is an issue with the method call. In embodiments, the processing logic may identify a cause of the underperformance of the method call and include the cause of the underperformance in the indication provided to the tracing system. In some embodiments, the processing logic may perform one or more actions to remedy the cause of the underperformance.

To more accurately identify a particular section of code of a method call that is underperforming, the processing logic may insert a synthetic span into the method call. The synthetic span can acquire a duration of time to execute a first set of source code of the method call. The processing logic can determine if the first set of source code is causing the method call to underperform, or if the remaining source code of the method call is causing the method call to underperform by comparing the duration of the synthetic span to the duration of the remaining code. Upon determining which set of source code is causing the method call to underperform, the processing logic may iteratively insert synthetic spans a number of times until a particular portion of the source code that is causing the underperformance is identified.

By having processing logic of a service monitor spans and identify underperformance, rather than sending all tracing data to a tracing system, the amount of data being transmitted to the tracing system is reduced, reducing bandwidth consumption. Furthermore, the causes of underperformance may be more quickly be identified, enabling service developed to quickly debug issues causing underperformance.

Although examples of the disclosure describe using spans to acquire timing information and identify underperformance of method calls and/or internal processes of services/applications, aspects of the disclosure may be applied to any types of application processes.

FIG. 1 is a block diagram that illustrates an example microservice architecture 100, in accordance with some embodiments of the present disclosure. The microservice architecture 100 may include host systems 110*a, b*, tracing system 140, and client device 150.

As illustrated in FIG. 1, microservice architecture 100 includes host systems 110*a, b* that include computing processing devices 120*a, b* and data stores 130*a, b*, respectively. The microservice architecture may also include a tracing system 140 that includes a computing processing device 120*c* and data store 130*c*. The host systems 110*a, b*, tracing system 140, and client device 150 are coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment, communication towers (e.g. cell towers), etc. The network 105 may carry communications (e.g., data, message, packets, frames, etc.) between the various components of host systems 110*a, b*.

The data stores 130*a-c* may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The host systems 110*a, b*, tracing system 140, and client device 150 may include any suitable type of computing device or machine that has a programmable processor including, for example, server computers, desktop computers, laptop computers, tablet computers, smartphones, set-top boxes, etc. In some examples, host systems 110*a, b*, tracing system 140, and client device 150 may comprise a single machine or may include multiple interconnected machines (e.g., multiple servers configured in a cluster). Host systems 110*a, b*, tracing system 140, and client device 150 may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

Processing device 120*a* of host system 110*a* and processing device 120*b* of host system 110*b* may execute services 125*a* and 125*b* of an application, respectively. In some embodiments, service 125*a* and/or service 125*b* may be executed within containers that serve as isolated execution environments for service 125*a* and/or service 125*b*. In embodiments, service 125*a* and/or service 125*b* may be executed by one or more virtual machines (VMs) that are software implementations of a machine that executes programs as though it was an actual physical machine. Although illustrated as being executed by two different host systems (e.g., host systems 110*a, b*), in embodiments service 125*a* and service 125*b* may be executed by the same host system.

In embodiments, processing devices 120*a, b* may execute span generation components 129*a, b* that are embedded in services 125*a, b*, respectively. The span generation components 129*a, b* may monitor spans and nested spans of services (e.g., services 125*a, b*) to determine if any method calls and/or internal processes are causing the service to underperform. The span generation components 129*a, b* may insert synthetic spans in one or more method calls/internal processes of the service to precisely identify sections of source code that are causing the method calls/internal processes to underperform. Further details regarding span generation components 129*a, b* will be discussed at FIGS. 2-9 below.

Figure 2:
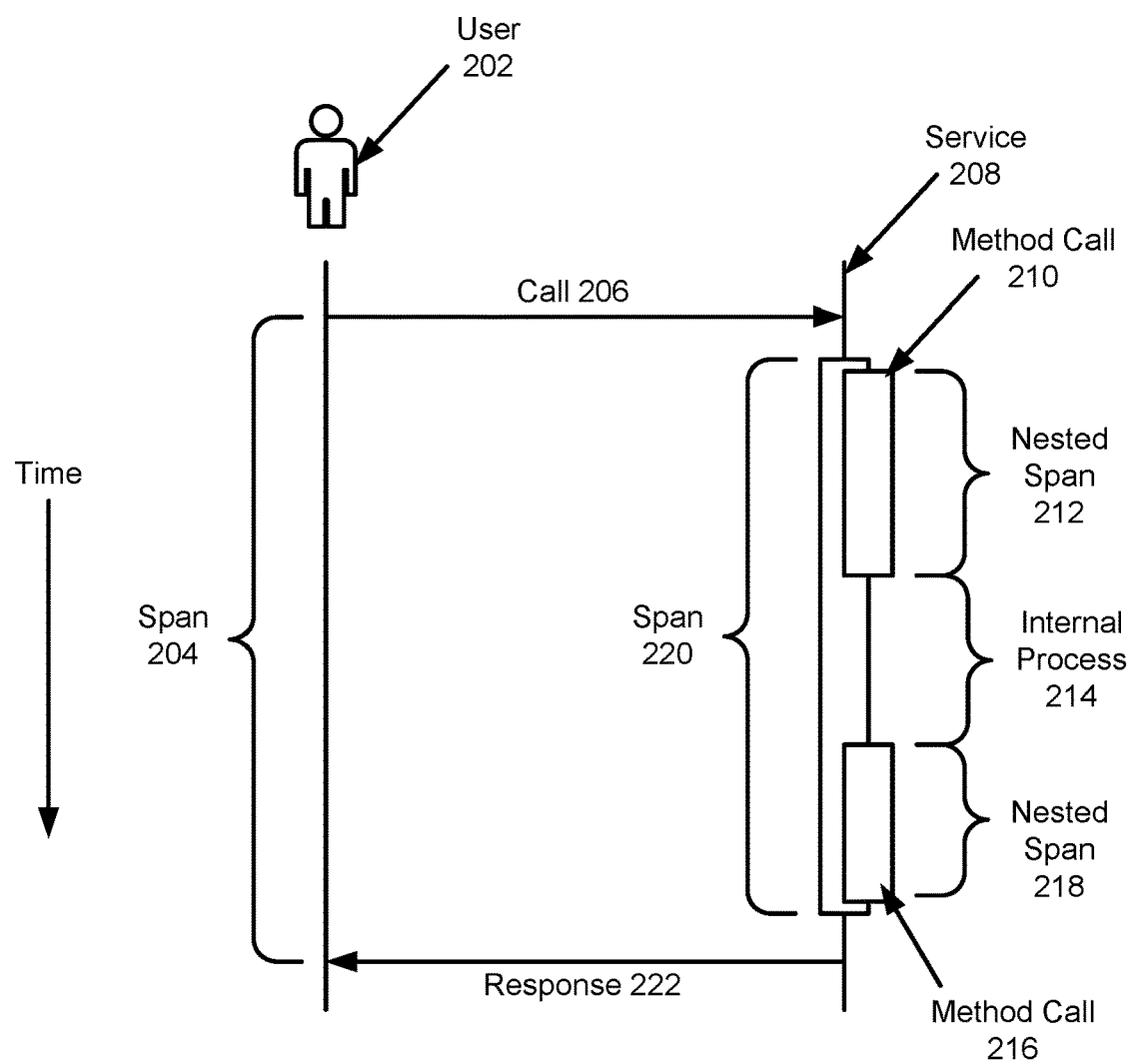
FIG. 2 is an illustration of an example of generating spans for a service to identify underperformance in accordance with embodiments of the disclosure.

FIG. 2 is an illustration 200 of an example of generating spans for a service to identify underperformance in accordance with embodiments of the disclosure. In illustration 200, a user 202 of an application may place a call 206 to a service 208. For example, an application of a client device of user 202 may place a call 206 to service 208. Upon placing the call 206 to the service 208, a span 204 may be generated by processing logic of a client device of user 202. The span 204 may correspond to the amount of time elapsed from user 202 transmitting the call 206 to the service 208 and the user 202 receiving the response 222 from service 208.

Upon receiving the call 206 from user 202, processing logic of a processing device executing service 208 may generate a span 220 that corresponds to the amount of time to execute and method calls and/or internal processes of service 208. In embodiments, span 220 may include a trace identification for the tracing operation being perform service 208. As previously described, service 208 may include hooks and the trace identification is used to generate nested spans that correspond to the amount of time to run the individual method calls of the service 208. Accordingly, upon generating span 220, the trace identification may be passed to method call 210 and a nested span 212 may be generated for method call 210. The nested span 212 may include timing information that corresponds to an amount of time to execute method call 210.

Upon executing the method call 210, in some embodiments, service 208 may execute one or more internal processes 214 of service 208. In embodiments, the service 208 may not generate a nested span for the internal process 214, and thus, the timing information of the internal processes 214 may be subsequently determined, as will be described in further detail below.

Upon performing the internal process 214 of service 208, the trace identification may be passed to method call 216. Upon receiving the trace identification, the nested span 218 may be generated for method call 216. The nested span 218 may include timing information that corresponds to an amount of time to execute method call 216. Upon executing method call 216, the execution of service 208 may complete and a response 222 including the results of executing service 208 may be transmitted to user 202.

In embodiments, the processing logic of service 208 may determine the timing information of internal process 214 based on the timing information from span 220, nested span 212, and nested span 218. As discussed above, span 220 may correspond to the amount of time to execute service 208, nested span 212 may correspond to the amount of time to execute method call 210, and nested span 218 may correspond to the amount of time to execute method call 216. Accordingly, the amount of time to execute internal process 214 may be determined by subtracting the amounts of time of nested span 212 and nested span 218 from span 220 of service 208. For example, if the amount of time for span 220 is 10 seconds, the amount of time for nested span 212 is 4 seconds, and the amount of time for nested span 218 is 3 seconds, then the amount of time to execute the internal process 214 may be 3 seconds (e.g., 10 seconds−4 seconds−3 seconds).

Although service 208 is shown as having multiple processes (e.g., method calls 210, 216 and internal process 214), such processes are shown for illustrative purposes only. Aspects of the disclosure may be utilized by any number of services including any number of processes. For example, aspects of the disclosure may be utilized to perform tracing operations on a single process and/or insert a synthetic span into a single process.

Figure 3A:
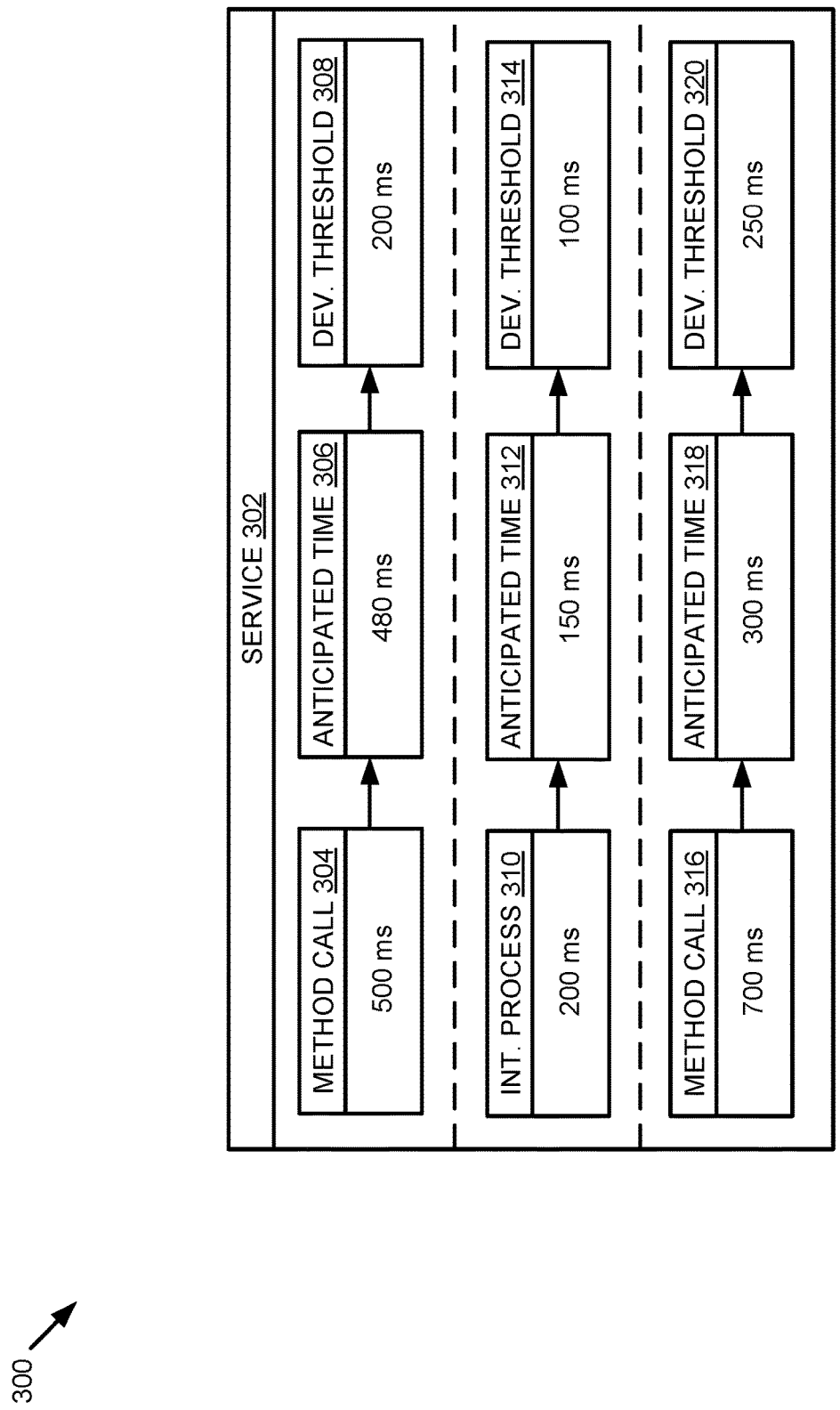
FIG. 3A is an illustration of an example of determining whether a method call or an internal process of a service are causing the service to underperform in accordance with embodiments of the disclosure.

FIG. 3A is an illustration 300 of an example of determining whether a method call or an internal process of a service are causing the service to underperform in accordance with embodiments of the disclosure. Illustration 300 includes service 302, method call 304, internal process 310, and method call 316 that may correspond to service 208, method call 210, internal process 214, and method call 216 of FIG. 2, respectively.

To determine if a particular method call or internal process of service 302 is underperforming, the service 302 may compare the amounts of time to execute the method calls and/or internal processes to corresponding anticipated times of execution. In an embodiment, the anticipated times may correspond to an average run time for the method calls/internal processes. In embodiments, each of the method calls and/or internal processes may have a corresponding deviation threshold that corresponds to the deviation of an amount of time to execute a method call/internal process from the anticipated time to execute the method call/internal process. If the deviation between the method call/internal process and the anticipated time satisfies the deviation threshold, then the service 302 may identify the method call/internal process as causing the service 302 to underperform. In embodiments, the deviation may satisfy the deviation threshold if the deviation is greater than or equal to the deviation threshold. In some embodiments, the deviation may satisfy the deviation threshold if the deviation is less than or equal to the deviation threshold. For illustration 300, the deviation threshold may be satisfied if the deviation is greater than or equal to the deviation threshold.

Referring to FIG. 3A, the amount of time to execute method call 304 is 500 milliseconds (ms). The anticipated time 306 to execute method call 304 is 480 ms. Accordingly, the deviation between the amount of time to execute method call 304 and the anticipated time 306 is 20 ms. The deviation threshold 308 for method call 304 is 200 ms. Because the deviation of 20 ms is less than the deviation threshold of 200 ms, the deviation does not satisfy the deviation threshold 308. Accordingly, the service 302 may determine that method call 304 is not causing service 302 to underperform.

The amount of time to execute internal process 310 is 200 ms. The anticipated time 312 to execute internal process 310 is 150 ms. Accordingly, the deviation between the amount of time to execute internal process 310 and the anticipated time 312 is 50 ms. The deviation threshold 314 for internal process 310 is 100 ms. Because the deviation of 50 ms is less than the deviation threshold of 100 ms, the deviation does not satisfy the deviation threshold 314. Accordingly, the service 302 may determine that internal process 310 is not causing service 302 to underperform.

The amount of time to execute method call 316 is 700 ms. The anticipated time 318 to execute method call 316 is 300 ms. Accordingly, the deviation between the amount of time to execute method call 316 and the anticipated time 318 is 400 ms. The deviation threshold 320 for method call 316 is 250 ms. Because the deviation of 400 ms is greater than the deviation threshold of 250 ms, the deviation satisfies the deviation threshold 320. Accordingly, the service 302 may determine that method call 316 is causing service 302 to underperform. In embodiments, upon identifying a method call or internal process as causing service 302 to underperform, service 302 may perform one or more remedial actions on the identified method call/internal process, as will be described below.

Although the previous example is illustrated as identifying an underperforming method call/internal process using a deviation threshold, embodiments of the disclosure may utilize any method of identifying a method call and/or internal process of a service that is causing the service to underperform.

Figure 3B:
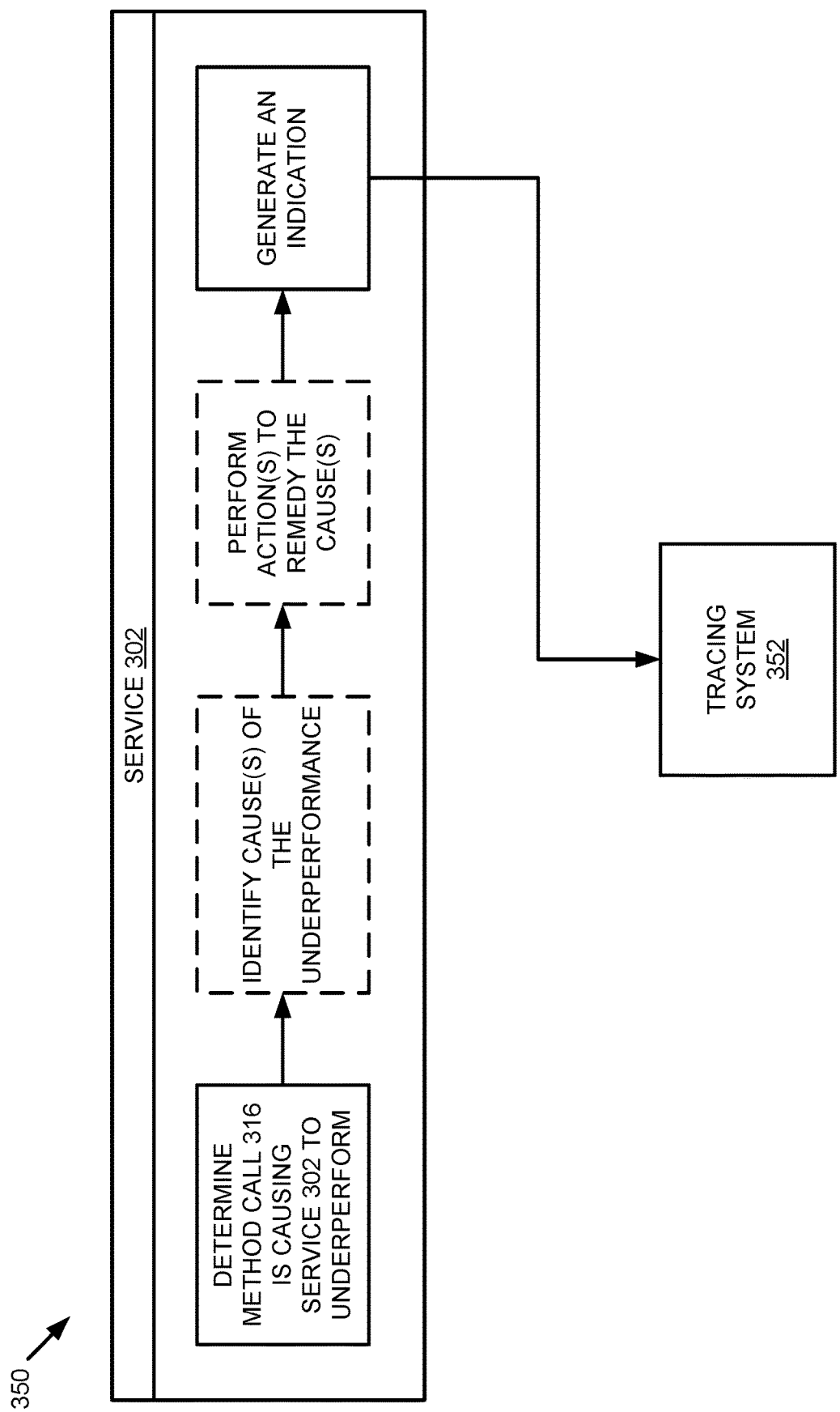
FIG. 3B is an illustration of an example of a service performing one or more remedial actions on a method call that is causing the service to underperform in accordance with embodiments of the disclosure.

FIG. 3B is an illustration 350 of an example of a service performing one or more remedial actions on a method call that is causing the service to underperform in accordance with embodiments of the disclosure. In illustration 350, service 302 has determined that method call 316 is causing service 302 to underperform, as described at FIG. 3A. Upon determining that method call 316 is causing service 302 to underperform, the service 302 may perform one or more remedial actions on method call 316.

In some embodiments, a remedial action may be service 302 identifying one or more causes of the underperformance. For example, service 302 may determine that method call 316 includes a call to a database pool and that the database pool only has 5 connections that are limiting bandwidth. Accordingly, service 302 may determine the lack of a sufficient number of connections to the database pool is a cause of the underperformance of method call 316.

In embodiments, a remedial action may be service 302 performing one or more actions to remedy the cause of the underperformance. For example, if the cause of the underperformance is the lack of a sufficient number of connections to the database pool, then the service 302 may increase the number of connections to the database pool.

In an embodiment, a remedial action may be generating an indication that method call 316 is causing service 302 to underperform. Upon generating the indication, service 302 may transmit the indication to tracing system 352. In embodiments, upon receiving the indication, the tracing system 352 may generate and provide a report/notification to an administrator of the service 302 to enable the administrator to debug method call 316.

In embodiments, the indication may include an identification of the particular method call that is causing service 302 to underperform. For example, the indication may include an identification of method call 316 that is causing service 302 to underperform. In some embodiments, the indication may include the one or more causes of the underperformance. For example, the indication may indicate that the lack of a sufficient number of connections to the database pool is causing method call 316 to underperform. In an embodiment, the indication may include the one or more actions that were performed to remedy the cause of the underperformance. For example, the indication may indicate that service 302 increased the number of connections to the database pool to remedy the cause of method call's 316 underperformance.

Figure 4:
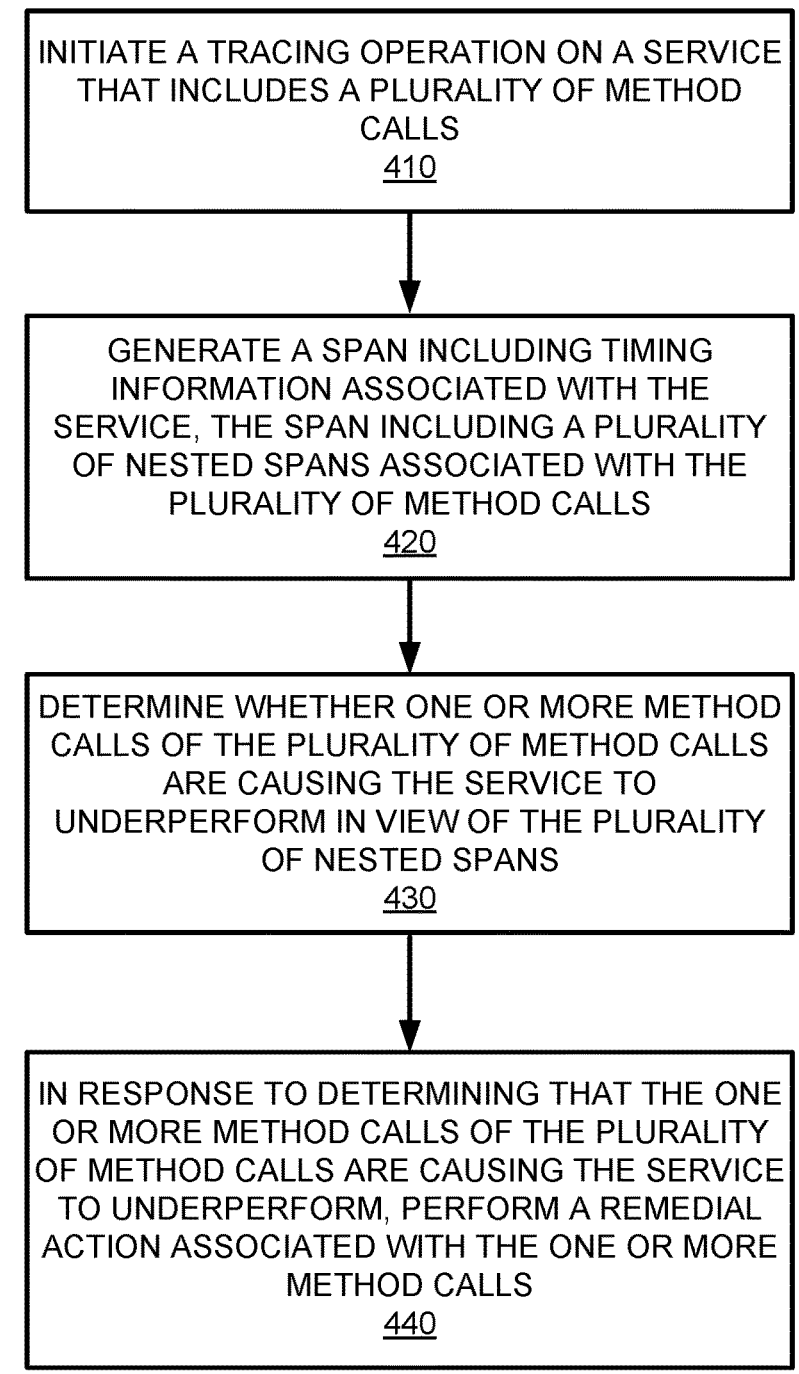
FIG. 4 is a flow diagram of a method of using a tracing operation to identify causes of underperformance of a service, in accordance with some embodiments.

FIG. 4 is a flow diagram of a method 400 of using a tracing operation to identify causes of underperformance of a service, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by span generation component 129a, b of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where the processing logic initiates a tracing operation on a service that includes a plurality of method calls. In some embodiments, the processing logic may initiate the tracing operation on the service in response to determining that an amount of time to execute the service exceeds a threshold amount of time. In embodiments, the processing logic may initiate the tracing operation on the service in response to determining that the amount of time to execute the service deviates from an average time to execute the service by a threshold amount. In an embodiment, the processing logic may initiate the tracing operation in response from receiving a command, for example from an administrator, to initiate the tracing operation.

At block 420, the processing logic generates a span including timing information associated with the service. The span may include a plurality of nested spans associated with the plurality of method calls of the service.

At block 430, the processing logic determines whether one or more method calls of the plurality of method calls are causing the service to underperform in view of the plurality of nested spans. In embodiments, the processing logic may determine whether one or more method calls are causing the service to underperform by using a deviation threshold, as previously described at FIG. 3A.

At block 440, in response to determining that the one or more method calls of the plurality of method calls are causing the service to underperform, perform a remedial action associated with the one or more method calls. In some embodiments, the remedial action may include generating and transmitting an indication to a tracing system identifying the one or more method calls that are causing the service to underperform. In embodiments, the remedial action may include identifying one or more causes for the underperformance by the one or more method calls. In an embodiment, the remedial action may include performing one or more actions to remedy the one or more causes for underperformance.

Figure 5B:
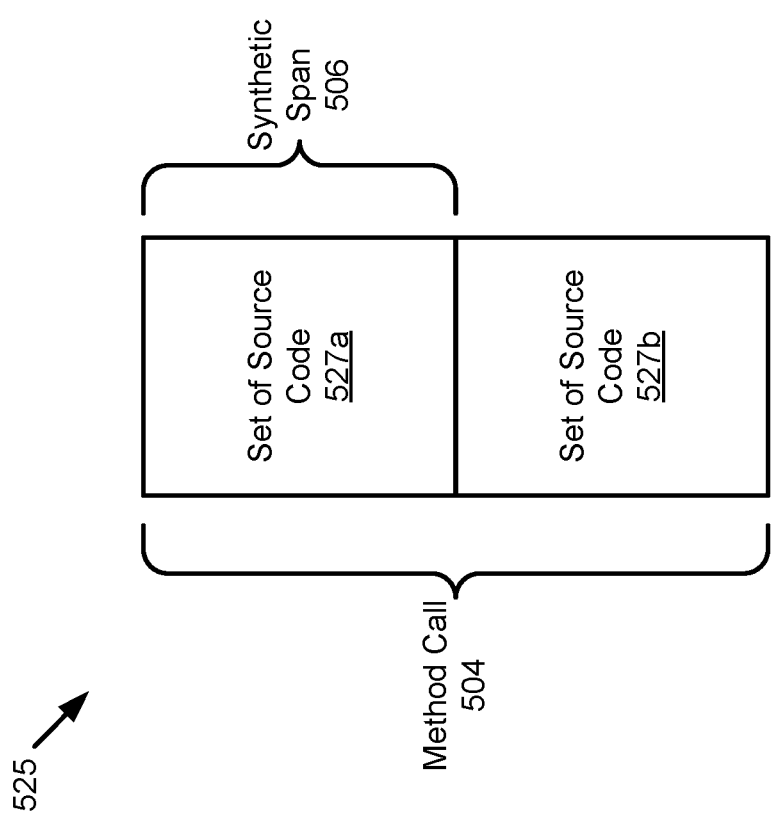
FIG. 5B is an illustration of an example of identifying a set of source code associated with an inserted synthetic span, in accordance with embodiments of the disclosure.
Figure 5A:
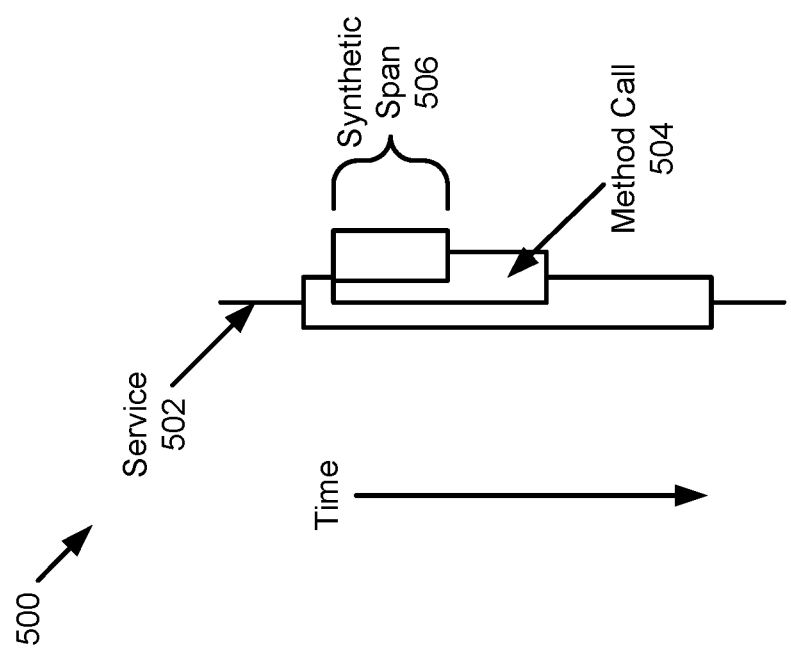
FIG. 5A is an illustration of an example of inserting a synthetic span into a method call of a service, in accordance with embodiments of the disclosure.

FIG. 5A is an illustration 500 of an example of inserting a synthetic span into a method call of a service, in accordance with embodiments of the disclosure. Service 502 includes a method call 504, as previously described. A synthetic span 506 may be inserted into method call 504 to acquire timing information associated with a portion of the method call. For example, the synthetic span 506 may be inserted into method call 504 to acquire timing information associated with a set of source code of method call 504. In some embodiments, a synthetic span 506 may be inserted into a method call 504 in response to determining that the method call 504 is causing the service 502 to underperform, as previously described. In embodiments, the synthetic span 506 may be inserted into a method call 504 in response to receiving a command, for example from an administrator, to insert the synthetic span 506 into the method call 504. Inserting a synthetic span 506 into an underperforming method call 504 may allow for more precise identification of a particular set of source code of the method call 504 that is causing the method call 504 to underperform.

FIG. 5B is an illustration 525 of an example of identifying a set of source code associated with an inserted synthetic span, in accordance with embodiments of the disclosure. As discussed above, the synthetic span 506 may be inserted into method call 504 to acquire timing information for a set of source code 527a of method call 504. The set of source code 527a may include one or more lines of source code of method call 504 that correspond to the location of insertion of the synthetic span 506. For example, if the location of the synthetic span 506 is at the midpoint of the source code for method call 504, then the set of source code 527a may correspond to the first half of the source code of method call 504 and the set of source code 527b may correspond to the second half of the source code of method call 504. Timing information for the remaining source code of method call 504 (e.g., set of source code 527b) may be determined by taking the difference between the amount of time to execute method call 504 (determined using a nested span) and the amount of time to execute the set of source code 527a (determined using synthetic span 506), as will be described in additional detail below.

Figure 5D:
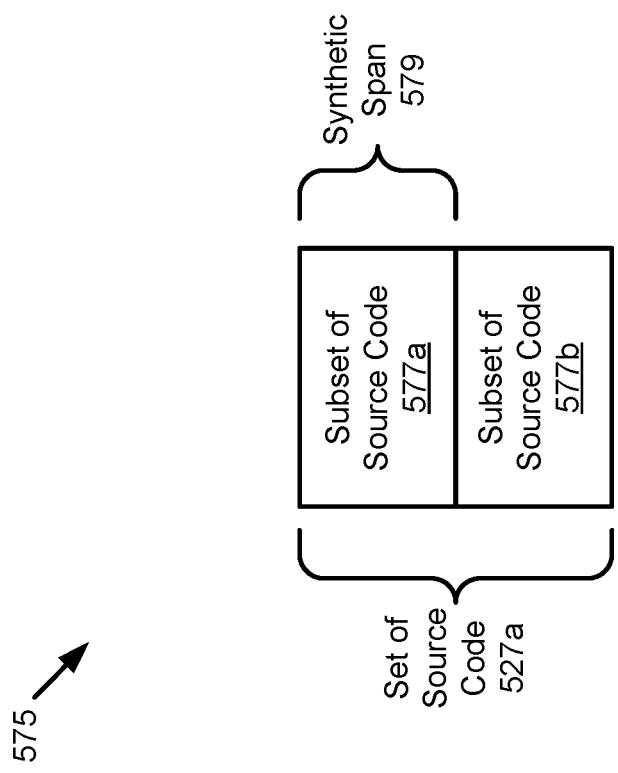
FIG. 5D is an illustration of an example of inserting a second synthetic span into a set of source code of a method call, in accordance with embodiments of the disclosure.
Figure 5C:
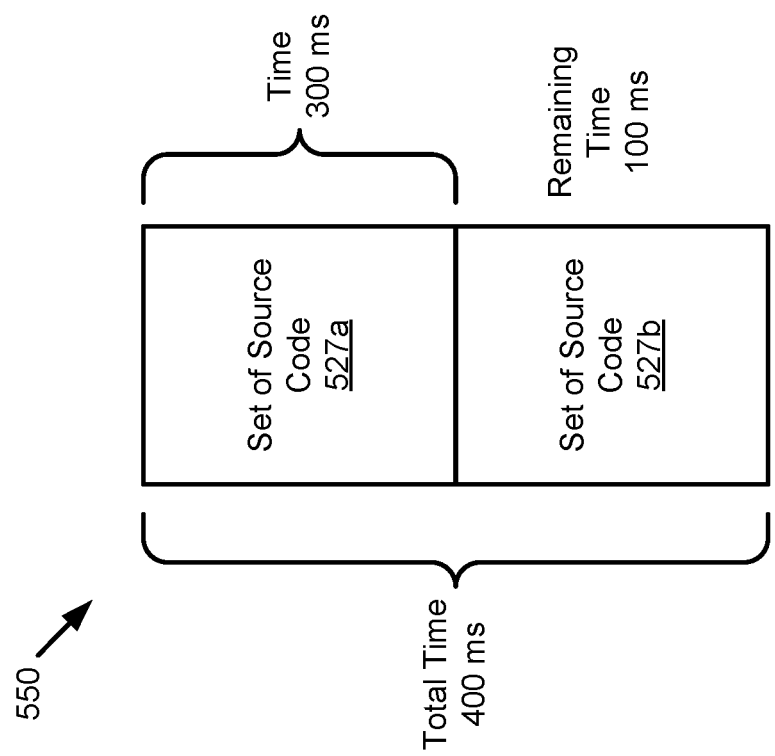
FIG. 5C is an illustration of an example of identifying a set of source code of a method call that is causing the method call to underperform, in accordance with embodiments of the disclosure.

FIG. 5C is an illustration 550 of an example of identifying a set of source code of a method call that is causing the method call to underperform, in accordance with embodiments of the disclosure. In embodiments, a set of source code may be causing a method call to underperform if the set of source code takes a longer time to execute than the remaining set of source code of the method call.

Referring to FIG. 5C, the amount of time to execute the method call is 400 ms. The amount of time to execute the set of source code 527a, determined using the synthetic span, is 300 ms. Accordingly, the remaining time of 100 ms corresponds to the amount of time to execute set of source code 527b. Because the amount of time to execute the set of source code 527a is greater than the amount of time to execute the set of source code 527b, the set of source code 527a may be identified as the set of source code causing the method call to underperform.

FIG. 5D is an illustration 575 of an example of inserting a second synthetic span into a set of source code of a method call, in accordance with embodiments of the disclosure. In some embodiments, a second synthetic span 579 may be inserted into a set of source code 527a to acquire timing information for subset of source code 577a of the set of source code 527a. In embodiments, the synthetic span 579 may be inserted into a set of source code 527a that has been identified as causing underperformance.

The subset of source code 577a may include one or more lines of source code of the set of source code 527a that correspond to the location of insertion of the synthetic span 579. For example, if the location of the synthetic span 579 is at the midpoint of the set of source code 577a, then the subset of source code 577a may correspond to the first half of the set of source code 527a and the subset of source code 577b may correspond to the second half of the set of source code 527a. Timing information for the subset of source code 577b may be determined by taking the difference between the amount of time to execute the set of source code 527a (determined using synthetic span 506) and the amount of time to execute the subset of source code 577a (determined using synthetic span 579), as previously described.

In some embodiments, one of subset of source code 577a or subset of source code 577b may be identified as causing the underperformance, as previously described at FIG. 5C. In embodiments, a third synthetic span may be inserted into the subset of source code that is identified as causing the underperformance. In an embodiment, synthetic spans may be iteratively inserted into increasingly smaller sets of source code of a method call using the above process. For example, synthetic spans may be iteratively inserted into increasingly smaller sets of source code until a single line of the source code of the method call is identified as causing the underperformance.

Figure 6:
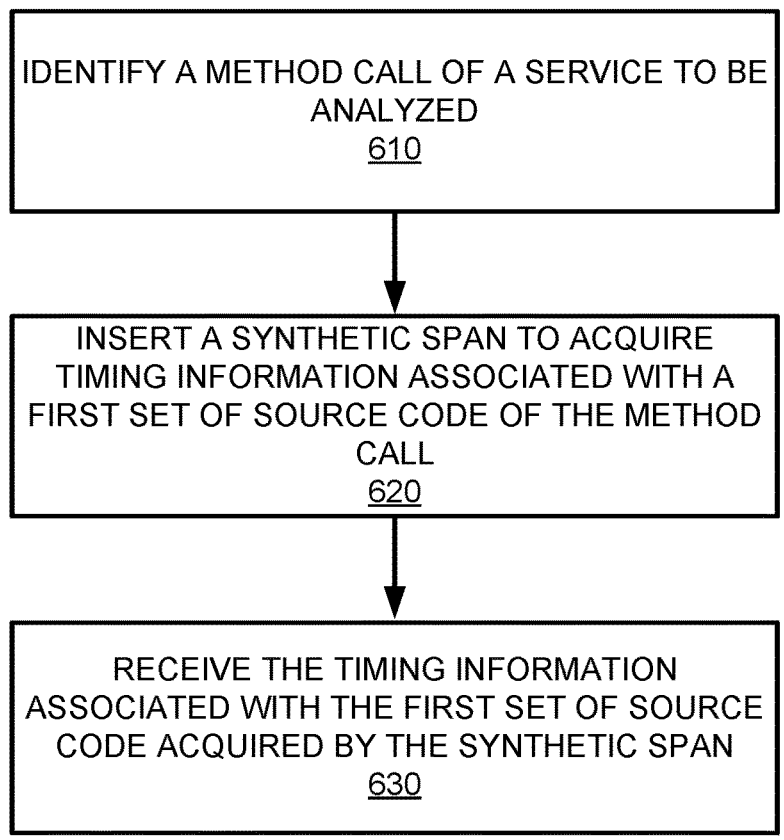
FIG. 6 is a flow diagram of a method of inserting a synthetic span into a method call of a service, in accordance with some embodiments.

FIG. 6 is a flow diagram of a method 600 of inserting a synthetic span into a method call of a service, in accordance with some embodiments. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 600 may be performed by span generation component 129a, b of FIG. 1.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

Method 600 begins at block 610, where the processing logic identifies a method call of a service to be analyzed. In some embodiments, the method call may be identified based on a determination that the method call is underperforming. In embodiments, the method call may be identified in response to receiving a command, for example from an administrator, to analyze the method call.

At block 620, the processing logic inserts a synthetic span to acquire timing information associated with a first set of source code of the method call.

At block 630, the processing logic receives the timing information associated with the first set of source code that was acquired by the synthetic span. For example, the processing logic may receive timing information that indicates that the amount of time to execute the first set of source code was 500 ms.

Figure 7:
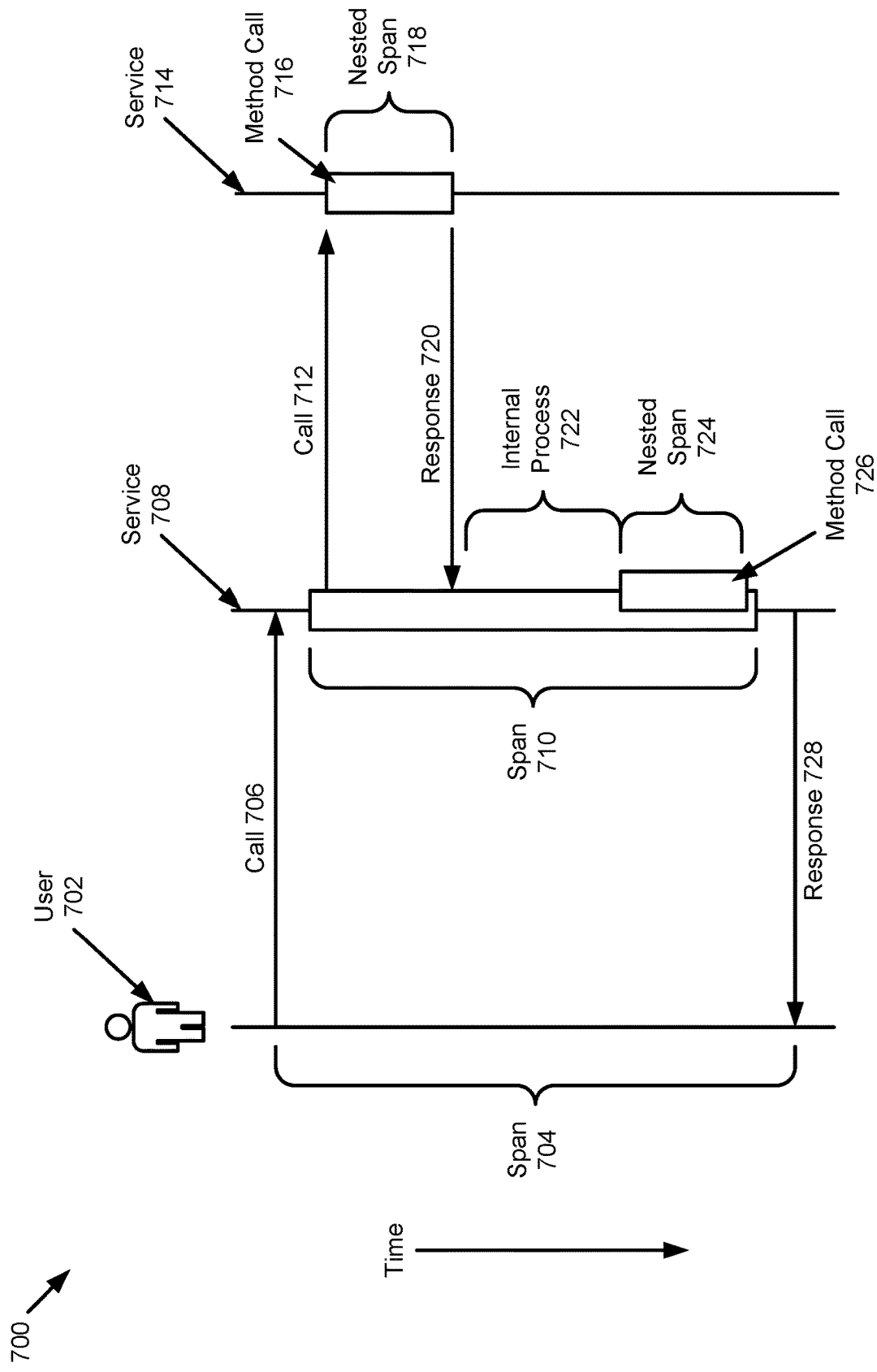
FIG. 7 is an illustration of an example of generating spans for multiple services to identify underperformance in accordance with embodiments of the disclosure.

FIG. 7 is an illustration 700 of an example of generating spans for multiple services to identify underperformance in accordance with embodiments of the disclosure. Illustration 700 may include elements and processes that are similar to those described in FIG. 2. However, in illustration 700, service 708 includes a call 712 to another service 714. Accordingly, upon generating span 710, service 708 may transmit a call 712 to service 714. The call 712 may include a trace identifier for the tracing operation being performed. Upon receipt of the call 712, service 714 may generate a nested span 718 to acquire timing information associated with method call 716 of service 714. For example, the nested span 718 may acquire the amount of time to execute method call 716.

Upon completion of the execution of method call 716, service 714 may transmit a response 720 back to service 708. The response 720 may include the timing information acquired by nested span 718 as well as the trace identifier for the tracing operation being performed. Service 708 may proceed with acquiring/determining corresponding timing information for internal process 722 and method call 726 (using nested span 724), as previously described at FIG. 2.

In embodiments, upon acquiring the timing information for the method calls/internal processes (e.g., method call 716, internal process 722, and method call 726), service 708 may determine if any of the method calls/internal processes are underperforming. If any of the method calls/internal processes are underperforming, then the service 708 may perform one or more remedial actions, as previously described.

In embodiments, if service 708 determines that method call 716 (executed by service 714) is underperforming, service 708 may transmit an indication to service 714. The indication may indicate that method call 716 of service 714 is underperforming. In some embodiments, upon receiving the indication, service 714 may perform one or more remedial actions, as previously described at FIG. 3B. In embodiments, upon receiving the indication, service 714 may insert synthetic span(s) into method call 716 to acquire timing information associated with one or more sets of source code of method call 716, as previously described at FIGS. 5A-D.

Figure 8:
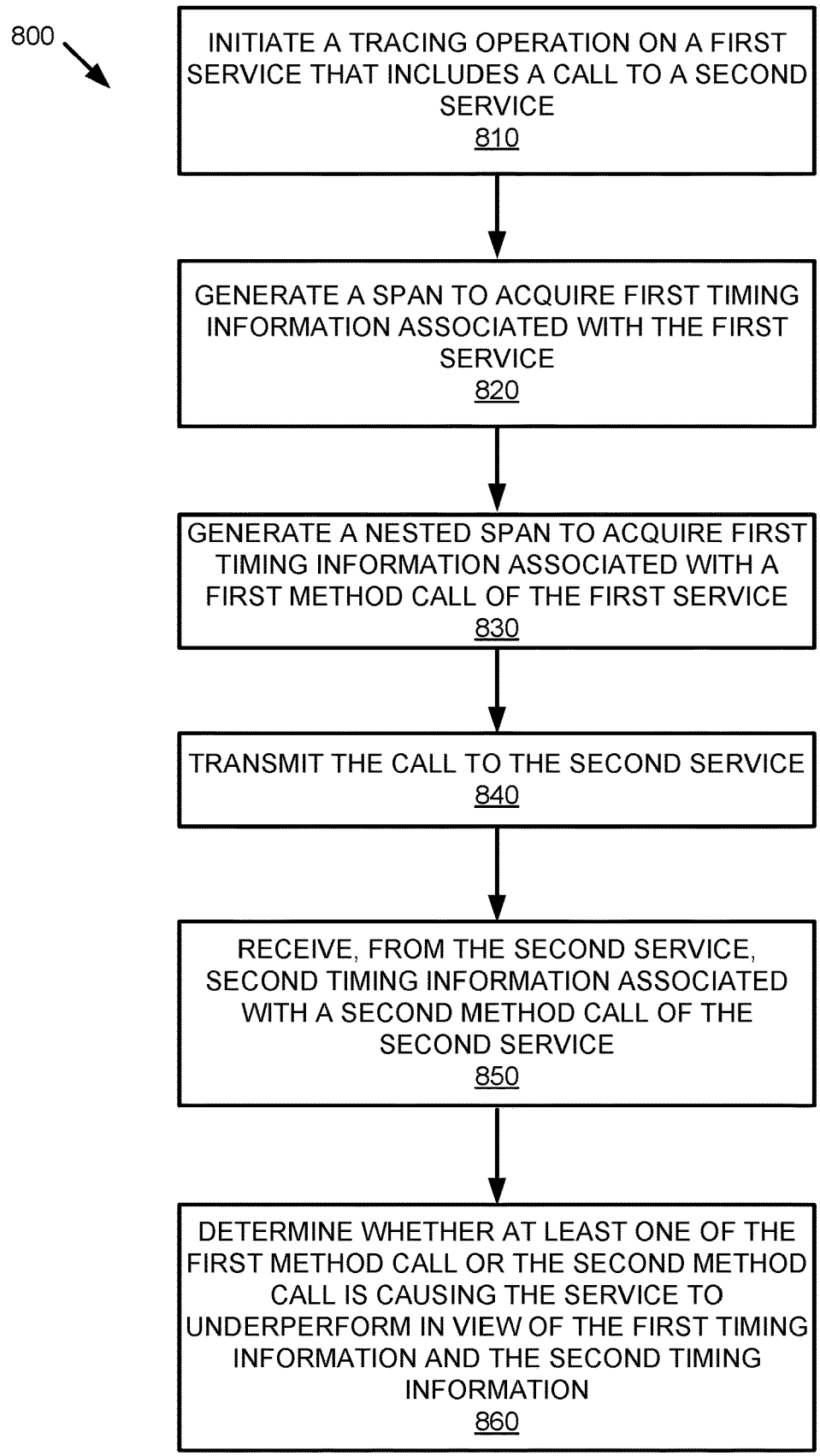
FIG. 8 is a flow diagram of a method of determining underperformance of one or method calls of multiple services, in accordance with some embodiments.

FIG. 8 is a flow diagram of a method 800 of determining underperformance of one or method calls of multiple services, in accordance with some embodiments. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 800 may be performed by span generation component 129*a, b* of FIG. 1.

With reference to FIG. 8, method 800 illustrates example functions used by various embodiments. Although specific function blocks ("blocks") are disclosed in method 800, such blocks are examples. That is, embodiments are well suited to performing various other blocks or variations of the blocks recited in method 800. It is appreciated that the blocks in method 800 may be performed in an order different than presented, and that not all of the blocks in method 800 may be performed.

Method 800 begins at block 810, where the processing logic initiates a tracing operation on a first service that includes a call to a second service. In embodiments, the processing logic may initiate the tracing operation in response to determining that the first service is underperforming. In some embodiments, the processing logic may initiate the tracing operation in response to receiving a command to initiate the tracing operation.

At block 820, the processing logic generates a span to acquire first timing information associated with the first service.

At block 830, the processing logic generates a nested span to acquire first timing information associated with a first method call of the first service.

At block 840, the processing logic transmits the call to the second service.

At block 850, the processing logic receives, from the second service, second timing information associated with a second method call of the second service. In embodiments, the second timing information may be included in a response from the second service that also includes the results of the execution of the second method call.

At block 860, the processing logic determines whether at least one of the first method call or the second method call is causing the service to underperform in view of the first timing information and the second timing information. In embodiments, the processing logic may determine whether the first or second method call is underperforming by comparing the amount of time to execute the first and second method calls to corresponding deviation thresholds, as previously described at FIG. 3A.

Figure 9:
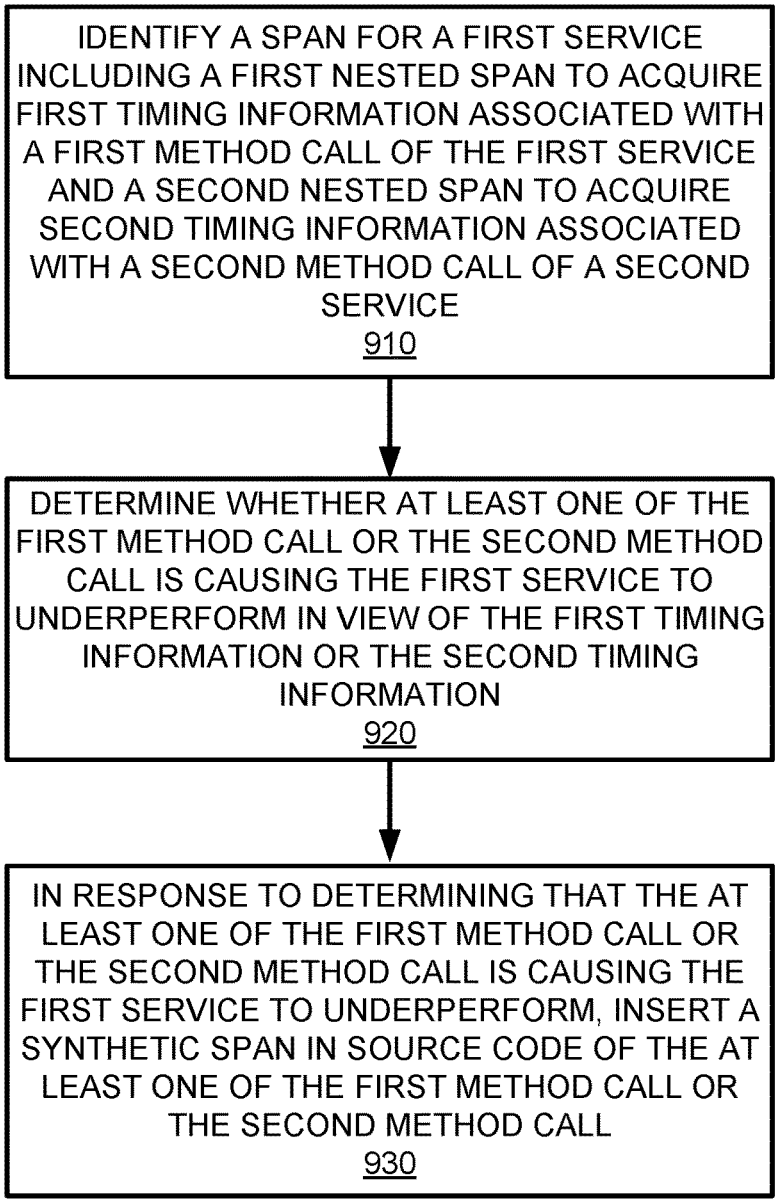
FIG. 9 is a flow diagram of a method of inserting one or more synthetic spans into one or method calls of multiple services, in accordance with some embodiments.

FIG. 9 is a flow diagram of a method 900 of inserting one or more synthetic spans into one or method calls of multiple services, in accordance with some embodiments. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 900 may be performed by span generation component 129*a, b* of FIG. 1.

With reference to FIG. 9, method 900 illustrates example functions used by various embodiments. Although specific function blocks ("blocks") are disclosed in method 900, such blocks are examples. That is, embodiments are well suited to performing various other blocks or variations of the blocks recited in method 900. It is appreciated that the blocks in method 900 may be performed in an order different than presented, and that not all of the blocks in method 900 may be performed.

Method 900 begins at block 910, where the processing logic identifies a span for a first service. The span may include a first nested span to acquire first timing information associated with a first method call of the first service. The span may also include a second nested span to acquire second timing information associated with a second method call of a second service.

At block 920, the processing logic determines whether at least one of the first method call or the second method call is causing the first service to underperform in view of the first timing information or the second timing information. In embodiments, the processing logic may determine whether the first or second method call is underperforming by comparing the corresponding timing information of the first and second method calls to corresponding deviation thresholds, as previously described at FIG. 3A.

At block 930, in response to determining that the at least one of the first method call or the second method call is causing the first service to underperform, the processing logic inserts a synthetic span in source code of the at least one of the first method call or the second method call. In embodiments, the processing logic may iteratively insert synthetic spans into increasingly smaller sets of source code of the at least one of the first method call or the second method call, as previously described.

Figure 10:
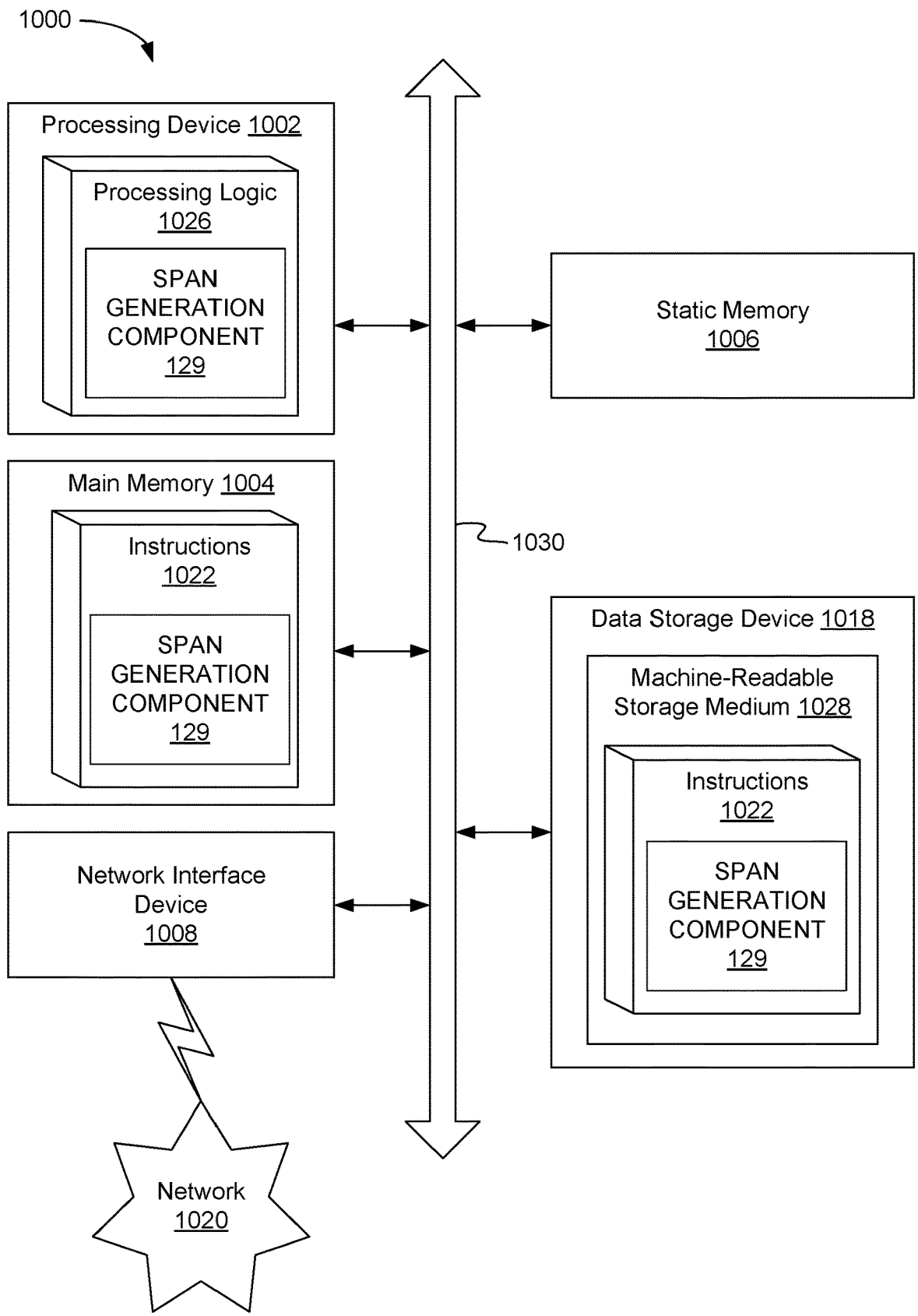
FIG. 10 is a block diagram of an example apparatus that may perform one or more of the operations described herein, in accordance with some embodiments of the present disclosure.

FIG. 10 is a block diagram of an example computing device 1000 that may perform one or more of the operations described herein, in accordance with some embodiments. Computing device 1000 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1000 may include a processing device (e.g., a general purpose processor, a PLD, etc.) 1002, a main memory 1004 (e.g., synchronous dynamic random access memory (DRAM), read-only memory (ROM)), a static memory 1006 (e.g., flash memory and a data storage device 1018), which may communicate with each other via a bus 1030.

Processing device 1002 may be provided by one or more general-purpose processing devices such as a microprocessor, central processing unit, or the like. In an illustrative example, processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1002 may also comprise one or more special-purpose processing devices such as an application specific integrated circuit (ASIC), a field programmable gate array (FPGA), a digital signal processor (DSP), network processor, or the like. The processing device 1002 may be configured to execute the operations described herein, in accordance with one or more aspects of the present disclosure, for performing the operations and steps discussed herein.

Computing device 1000 may further include a network interface device 1008 which may communicate with a network 1020. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

Data storage device 1018 may include a computer-readable storage medium 1028 on which may be stored one or more sets of instructions 1025 that may include instructions for a network policy component, e.g., span generation component 129 for carrying out the operations described herein, in accordance with one or more aspects of the present disclosure. Instructions 1025 may also reside, completely or at least partially, within main memory 1004 and/or within processing device 1002 during execution thereof by computing device 1000, main memory 1004 and processing device 1002 also constituting computer-readable media. The instructions 1025 may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method comprising initiating a tracing operation on a service, wherein the service comprises a plurality of method calls; generating a span comprising timing information associated with the service, wherein the span comprises a plurality of nested spans associated with the plurality of method calls; determining, by a processing device, whether one or more method calls of the plurality of method calls are causing the service to underperform in view of the plurality of nested spans; and in response to determining that the one or more method calls of the plurality of method calls are causing the service to underperform, performing a remedial action associated with the one or more method calls.

Example 2 is the method of Example 1, wherein each of the plurality of nested spans comprises timing information associated with a corresponding method call of the plurality of method calls.

Example 3 is the method of Example 1, wherein determining whether the one or more method calls of the plurality of method calls are causing the service to underperform in view of the plurality of spans comprises identifying a corresponding anticipated time for each of the plurality of method calls; determining a deviation between a corresponding anticipated time and corresponding timing information of each of the plurality of nested spans for each of the plurality of method calls; determining whether the deviation between the corresponding anticipated time and the corresponding timing information of each of the plurality of method calls satisfies a deviation threshold; and in response to determining that the deviation between the corresponding anticipated time and the corresponding time for the one or more method calls of the plurality of method calls satisfies the deviation threshold, determining that the one or more method calls of the plurality of method calls are causing the service to underperform.

Example 4 is the method of Example 1, wherein performing the remedial action associated with the one or more method calls comprises providing, to a tracing system, an indication of the one or more method calls that are causing the service to underperform.

Example 5 is the method of Example 1, wherein performing the remedial action associated with the one or more method calls comprises identifying one or more causes associated with the one or more method calls that are causing the service to underperform; and providing, to a tracing system, an indication of the one or more causes associated with the one or more method calls that are causing the service to underperform.

Example 6 is the method of Example 1, wherein performing the remedial action associated with the one or more method calls comprises identifying one or more causes associated with the one or more method calls that are causing the service to underperform; and performing one or more actions to remedy the one or more causes associated with the one or more method calls that are causing the service to underperform.

Example 7 is the method of Example 1, further comprising determining a time of an internal process of the service in view of the timing information of the tracing operation and a corresponding time for each of the plurality of method calls.

Example 8 is the method of Example 1, wherein performing the remedial action associated with the one or more method calls comprises inserting synthetic spans in each of the one or more method calls to identify a portion of code for each of the one or more method calls that causes the service to underperform.

Example 9 is a system comprising: a memory; and a processing device, operatively coupled to the memory, to: identify a method call of a service to be analyzed; insert a synthetic span to acquire timing information associated with a first set of source code of the method call; and receive the timing information associated with the first set of source code acquired by the synthetic span.

Example 10 is the system of Example 9, wherein the processing device is further to determine second timing information associated with a second set of source code of the method call in view of the first timing information, wherein the second set of source code of the method call corresponds to remaining source code of the method call other than the first set of source code.

Example 11 is the system of Example 10, wherein the processing device is further to determine whether the timing information is greater than the second timing information; and in response to determining that the first timing information is greater than the second timing information, insert a second synthetic span in the first set of the method call.

Example 12 is the system of Example 11, wherein the second synthetic span is inserted to acquire third timing information associated with a first subset of the first set of source code of the method call.

Example 13 is the system of Example 12, wherein the processing device is further to receive the third timing information associated with the first subset of the first set of source code of the method call; determine fourth timing information associated with a second subset of source code of the first set of source code of the method call; and determine whether the third timing information is greater than the fourth timing information.

Example 14 is the system of Example 9, wherein the processing device is further to determine whether the method call is causing the service to underperform, wherein the method call is identified for analyzation in response to determining that the method call is causing the service to underperform.

Example 15 is the system of Example 9, wherein the processing device is further to identify a second method call of the service to be analyzed; insert a second synthetic span for a first set of source code of the second method call; and receive second timing information associated with the first set of source code of the second method call.

Example 16 is a non-transitory computer-readable storage medium including instructions that, when executed by a processing device, cause the processing device to initiate, by the processing device, a tracing operation on a first service, wherein the first service comprises a call to a second service; generate a span associated with the first service; generate a nested span to acquire first timing information associated with a first method call of the first service; transmit the call to the second service; receive, from the second service, second timing information associated with a second method call of the second service; and determine whether at least one of the first method call or the second method call is causing the first service to underperform in view of the first timing information and the second timing information.

Example 17 is the non-transitory computer-readable storage medium of Example 16, wherein transmitting the call to the second service causes the second service to generate a second nested span to acquire the second timing information associated with the second method call of the second service.

Example 18 is the non-transitory computer-readable storage medium of Example 16, wherein to determine whether the first method call is causing the first service to underperform, the processing device is further to determine whether a deviation between an anticipated time for the first method call and the first timing information satisfies a deviation threshold; and in response to determining that the deviation between the anticipated time for the first method call and the first timing information satisfies the deviation threshold, determine that the first method call is causing the first service to underperform.

Example 19 is the non-transitory computer-readable storage medium of Example 18, wherein the processing device is further to in response to determining that the second method call is causing the first service to underperform, transmit, to the second service, an indication that the second method call is causing the first service to underperform, wherein the indication causes the second service to insert one or more synthetic spans into the second method call.

Example 20 is the non-transitory computer-readable storage medium of Example 16, wherein the processing device is further to in response to determining that the at least one of the first method call or the second method call is causing the first service to underperform, transmit, to a tracing system, an indication that the at least one of the first method call or the second method call is causing the first service to underperform.

Example 21 is the non-transitory computer-readable storage medium of Example 16, wherein the processing device is further to in response to determining that the first method call is causing the first service to underperform, perform a remedial action associated with the first method call.

Example 22 is the non-transitory computer-readable storage medium of Example 16, wherein the first service further comprises an internal process and wherein the processing device is further to determine a time associated with the internal process of the first service in view of the span of the first service, the first timing information of the first method call and the second timing information of the second method call.

Example 23 is a method comprising identifying a span for a first service comprising a first nested span to acquire first timing information associated with a first method call of the first service and a second nested span to acquire second timing information associated with a second method call of a second service; determining whether at least one of the first method call or the second method call is causing the first service to underperform in view of the first timing information and the second timing information; and in response to determining that the at least one of the first method call or the second method call is causing the first service to underperform, inserting, by a processing device, a synthetic span in source code of the at least one of the first method call or the second method call.

Example 24 is the method of Example 23, further comprising generating an indication that the at least one of the first method call or the second method call is causing the first service to underperform; and providing the indication to a tracing system.

Example 25 is the method of Example 23, further comprising in response to determining that the second method call is causing the first service to underperform, transmitting, to the second service, a command that causes the second service to insert a second synthetic span into a second set of source code of the second method call.

Example 26 is the method of Example 23, further comprising determine whether a first set of source code or a second set of source code of the at least one of the first method call or the second method call is causing the at least one of the first method call or the second method call to underperform; and in response to determining that the first set of source code is causing the at least one of the first method call or the second method call to underperform, inserting a second synthetic span into the first set of source code of the at least one of the first method call or the second method call.

Example 27 is the method of Example 23, wherein determining whether the at least one of the first method call or the second method call is causing the first service to underperform comprises determining whether a first deviation between a first anticipated time for the first method call and the first timing information satisfies a first deviation threshold or a second deviation between a second anticipated time for the second method call and the second timing information satisfies a second deviation threshold; and in response to determining that the first deviation satisfies the first deviation threshold or the second deviation satisfies the second deviation threshold, determine that the at least one of the first method call or the second method call is causing the first service to underperform.

Example 28 is an apparatus comprising means for initiating a tracing operation on a service, wherein the service comprises a plurality of method calls; means for generating a span comprising timing information associated with the service, wherein the span comprises a plurality of nested spans associated with the plurality of method calls; means for determining, by a processing device, whether one or more method calls of the plurality of method calls are causing the service to underperform in view of the plurality of nested spans; and in response to determining that the one or more method calls of the plurality of method calls are causing the service to underperform, means for performing a remedial action associated with the one or more method calls.

Example 29 is the apparatus of Example 28, wherein each of the plurality of nested spans comprises timing information associated with a corresponding method call of the plurality of method calls.

Example 30 is the apparatus of Example 28, wherein the means for determining whether the one or more method calls of the plurality of method calls are causing the service to underperform in view of the plurality of spans comprises means for identifying a corresponding anticipated time for each of the plurality of method calls; means for determining a difference between the corresponding anticipated time and the timing information of the plurality of nested spans for each of the plurality of method calls; means for determining whether the deviation between the corresponding anticipated time and the corresponding time of each of the plurality of method calls satisfies a time threshold; and in response to determining that the deviation between the corresponding anticipated time and the corresponding time for the one or more method calls of the plurality of method calls satisfies the time threshold, means for determining that the one or more method calls of the plurality of method calls are causing the service to underperform.

Example 31 is the apparatus of Example 28, wherein the means for performing the remedial action associated with the one or more method calls comprises means for providing, to a tracing system, an indication of the one or more method calls that are causing the service to underperform.

Example 32 is the apparatus of Example 28, wherein the means for performing the remedial action associated with the one or more method calls comprises means for identifying one or more causes associated with the one or more method calls that are causing the service to underperform; and means for providing, to a tracing system, an indication of the one or more causes associated with the one or more method calls that are causing the service to underperform.

Example 33 is the apparatus of Example 28, wherein the means for performing the remedial action associated with the one or more method calls comprises means for identifying one or more causes associated with the one or more method calls that are causing the service to underperform; and means for performing one or more actions to remedy the one or more causes associated with the one or more method calls that are causing the service to underperform.

Example 34 is the apparatus of Example 28, further comprising means for determining a time of an internal process of the service in view of the timing information of the tracing operation and a corresponding time for each of the plurality of method calls.

Example 35 is the apparatus of Example 28, wherein the means for performing the remedial action associated with the one or more method calls comprises means for inserting synthetic spans in each of the one or more method calls to identify a portion of code for each of the one or more method calls that causes the service to underperform.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    initiating a dynamic tracing operation on a service, wherein the service comprises a plurality of method calls;
    by using the dynamic tracing operation:
        generating, by executing the service, a span comprising timing information associated with the service, wherein the span comprises a plurality of nested spans associated with the plurality of method calls;
        determining, by a processing device, whether one or more method calls of the plurality of method calls are causing the service to underperform in view of the plurality of nested spans, wherein determining whether the one or more method calls of the plurality of method calls are causing the service to underperform in view of the plurality of nested spans comprises:
            identifying a corresponding anticipated time for each of the plurality of method calls;
            determining a deviation between a corresponding anticipated time and corresponding timing information of each of the plurality of nested spans for each of the plurality of method calls;
            determining whether the deviation between the corresponding anticipated time and the corresponding timing information of each of the plurality of method calls satisfies a deviation threshold;
            in response to determining that the deviation between the corresponding anticipated time and the corresponding time for the one or more method calls of the plurality of method calls satisfies the deviation threshold, determining that the one or more method calls of the plurality of method calls are causing the service to underperform; and
        in response to determining that the one or more method calls of the plurality of method calls are causing the service to underperform, performing a remedial action associated with the one or more method calls by increasing a number of connections to a database pool to increase bandwidth.

2. The method of claim 1, wherein each of the plurality of nested spans comprises timing information associated with a corresponding method call of the plurality of method calls.

3. The method of claim 1, wherein performing a second remedial action associated with the one or more method calls comprises:
    providing, to a tracing system, an indication of the one or more method calls that are causing the service to underperform.

4. The method of claim 1, wherein performing a second remedial action associated with the one or more method calls comprises:
    identifying one or more causes associated with the one or more method calls that are causing the service to underperform; and
    providing, to a tracing system, an indication of the one or more causes associated with the one or more method calls that are causing the service to underperform.

5. The method of claim 1, wherein performing a second remedial action associated with the one or more method calls comprises:
    identifying one or more causes associated with the one or more method calls that are causing the service to underperform; and
    performing one or more actions to remedy the one or more causes associated with the one or more method calls that are causing the service to underperform.

6. The method of claim 1, further comprising:
    determining a time of an internal process of the service in view of the timing information of the tracing operation and a corresponding time for each of the plurality of method calls.

7. The method of claim 1, wherein performing a second remedial action associated with the one or more method calls comprises:
    inserting synthetic spans in each of the one or more method calls to identify a portion of code for each of the one or more method calls that causes the service to underperform.

8. A system comprising:
    a memory; and
    a hardware processing device, operatively coupled to the memory, configured to:
        initiate a dynamic tracing operation on a service, wherein the service comprises a plurality of method calls;
        by using the dynamic tracing operation:
            generate, by executing the service, a span comprising timing information associated with the service, wherein the span comprises a plurality of nested spans associated with the plurality of method calls;
            determine whether one or more method calls of the plurality of method calls are causing the service to underperform in view of the plurality of nested spans, wherein to determine whether the one or more method calls of the plurality of method calls are causing the service to underperform in view of the plurality of nested spans, the processing device is further to:

identify a corresponding anticipated time for each of the plurality of method calls;

determine a deviation between a corresponding anticipated time and corresponding timing information of each of the plurality of nested spans for each of the plurality of method calls;

determine whether the deviation between the corresponding anticipated time and the corresponding timing information of each of the plurality of method calls satisfies a deviation threshold;

in response to determining that the deviation between the corresponding anticipated time and the corresponding time for the one or more method calls of the plurality of method calls satisfies the deviation threshold, determine that the one or more method calls of the plurality of method calls are causing the service to underperform; and in response to determining that the one or more method calls of the plurality of method calls are causing the service to underperform, perform a remedial action associated with the one or more method calls by increasing a number of connections to a database pool to increase bandwidth.

9. The system of claim 8, wherein each of the plurality of nested spans comprises timing information associated with a corresponding method call of the plurality of method calls.

10. The system of claim 8, wherein to perform a second remedial action associated with the one or more method calls, the processing device is further to:

provide, to a tracing system, an indication of the one or more method calls that are causing the service to underperform.

11. The system of claim 8, wherein to perform a second remedial action associated with the one or more method calls, the processing device is further to:

identify one or more causes associated with the one or more method calls that are causing the service to underperform; and provide, to a tracing system, an indication of the one or more causes associated with the one or more method calls that are causing the service to underperform.

12. The system of claim 8, wherein to perform a second remedial action associated with the one or more method calls, the processing device is further to:

identify one or more causes associated with the one or more method calls that are causing the service to underperform; and perform one or more actions to remedy the one or more causes associated with the one or more method calls that are causing the service to underperform.

13. The system of claim 8, wherein the processing device is further to:

determine a time of an internal process of the service in view of the timing information of the tracing operation and a corresponding time for each of the plurality of method calls.

14. The system of claim 8, wherein to perform a second remedial action associated with the one or more method calls, the processing device is further to:

insert synthetic spans in each of the one or more method calls to identify a portion of code for each of the one or more method calls that causes the service to underperform.

15. A non-transitory computer-readable storage medium including instructions that, when executed by a processing device, cause the processing device to:

initiate a dynamic tracing operation on a service, wherein the service comprises a plurality of method calls;

by using the dynamic tracing operation:

generate, by executing the service, a span comprising timing information associated with the service, wherein the span comprises a plurality of nested spans associated with the plurality of method calls;

determine whether one or more method calls of the plurality of method calls are causing the service to underperform in view of the plurality of nested spans, wherein to determine whether the one or more method calls of the plurality of method calls are causing the service to underperform in view of the plurality of nested spans, the processing device is further to:

identify a corresponding anticipated time for each of the plurality of method calls;

determine a deviation between a corresponding anticipated time and corresponding timing information of each of the plurality of nested spans for each of the plurality of method calls;

determine whether the deviation between the corresponding anticipated time and the corresponding timing information of each of the plurality of method calk satisfies a deviation threshold;

in response to determining that the deviation between the corresponding anticipated time and the corresponding time for the one or more method calls of the plurality of method calls satisfies the deviation threshold, determine that the one or more method calls of the plurality of method calls are causing the service to underperform; and in response to determining that the one or more method calls of the plurality of method calls are causing the service to underperform, perform a remedial action associated with the one or more method calls by increasing a number of connections to a database pool to increase bandwidth.

16. The non-transitory computer-readable storage medium of claim 15, wherein each of the plurality of nested spans comprises timing information associated with a corresponding method call of the plurality of method calls.

17. The non-transitory computer-readable storage medium of claim 15, wherein to perform a second remedial action associated with the one or more method calls, the processing device is further to:

provide, to a tracing system, an indication of the one or more method calls that are causing the service to underperform.

* * * * *

UNITED STATES PATENT AND TRADEMARK OFFICE
CERTIFICATE OF CORRECTION

| | |
|---|---|
| PATENT NO. | : 11,288,164 B2 |
| APPLICATION NO. | : 16/705911 |
| DATED | : March 29, 2022 |
| INVENTOR(S) | : Heiko Rupp |

It is certified that error appears in the above-identified patent and that said Letters Patent is hereby corrected as shown below:

On the Title Page

For item (72), please replace "Heiko Rupp, Stuttgart, DE (US)" with -- Heiko Rupp, Stuttgart, (DE) --.

Signed and Sealed this
Seventeenth Day of May, 2022

*Katherine Kelly Vidal*

Katherine Kelly Vidal
*Director of the United States Patent and Trademark Office*